(12) United States Patent
Hagiwara

(10) Patent No.: US 9,166,247 B2
(45) Date of Patent: Oct. 20, 2015

(54) LITHIUM-ION SECONDARY CELL AND METHOD FOR MANUFACTURING SAME

(75) Inventor: Hideki Hagiwara, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 38 days.

(21) Appl. No.: 13/985,601

(22) PCT Filed: Feb. 18, 2011

(86) PCT No.: PCT/JP2011/053570
§ 371 (c)(1),
(2), (4) Date: Nov. 26, 2013

(87) PCT Pub. No.: WO2012/111161
PCT Pub. Date: Aug. 23, 2012

(65) Prior Publication Data
US 2014/0072848 A1     Mar. 13, 2014

(51) Int. Cl.
*H01M 10/04*     (2006.01)
*H01M 4/04*      (2006.01)
*H01M 4/133*     (2010.01)
*H01M 4/1393*    (2010.01)
*H01M 4/587*     (2010.01)
*H01M 10/0525*   (2010.01)
*H01M 4/02*      (2006.01)

(52) U.S. Cl.
CPC ............ *H01M 10/0431* (2013.01); *H01M 4/04* (2013.01); *H01M 4/133* (2013.01); *H01M 4/1393* (2013.01); *H01M 4/587* (2013.01); *H01M 10/0525* (2013.01); *H01M 2004/021* (2013.01); *Y02E 60/122* (2013.01); *Y02T 10/7011* (2013.01)

(58) Field of Classification Search
CPC ............................. Y02T 10/7011; H01M 4/04
USPC ........................................... 429/94; 427/547
See application file for complete search history.

(56) References Cited

U.S. PATENT DOCUMENTS

2004/0072076 A1 *  4/2004  Matsubara et al. ........ 429/231.8
2010/0203390 A1 *  8/2010  Takamura et al. ......... 429/231.8

FOREIGN PATENT DOCUMENTS

| CN | 101662014 | 3/2010 |
|----|-----------|--------|
| JP | 2003-197189 | 7/2003 |
| JP | 2006-252945 | 9/2006 |

* cited by examiner

*Primary Examiner* — Patrick Ryan
*Assistant Examiner* — Monique Wills
(74) *Attorney, Agent, or Firm* — Finnegan, Henderson, Farabow, Garrett & Dunner, LLP

(57) ABSTRACT

The cell has a wound electrode assembly 50 including a positive electrode 64 and a negative electrode 84 that are wound with a separator 90 interposed therebetween, and a liquid electrolyte, wherein the negative electrode includes an elongated negative electrode current collector 82, and a negative electrode mixture layer 88 that is formed on the negative electrode current collector and contains at least a graphite material 85. The graphite material in the negative electrode mixture layer is arranged such that the (002) plane 85A of at least 50 mass % of the graphite material is perpendicular to the surface of the negative electrode current collector and parallel to the longitudinal direction of the elongated negative electrode current collector.

7 Claims, 22 Drawing Sheets

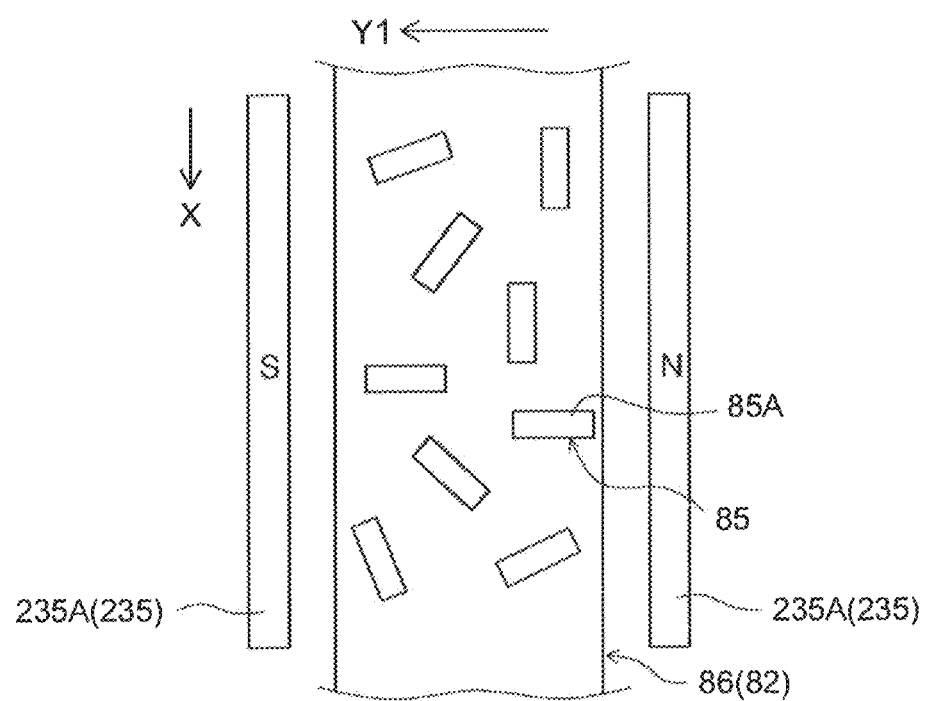

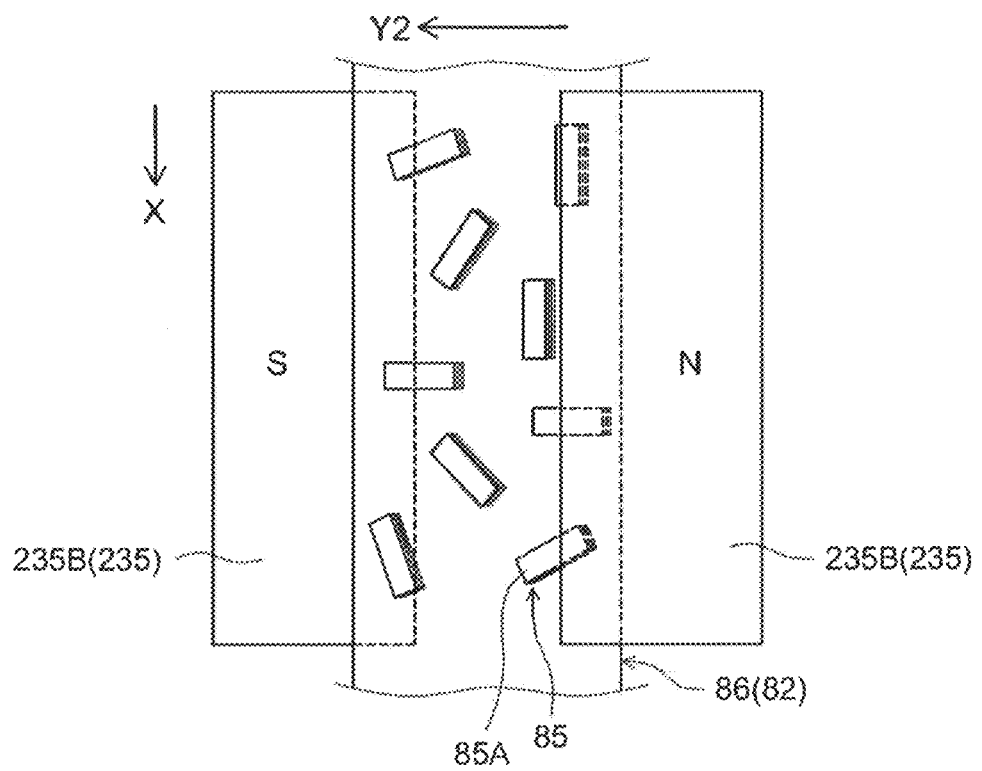

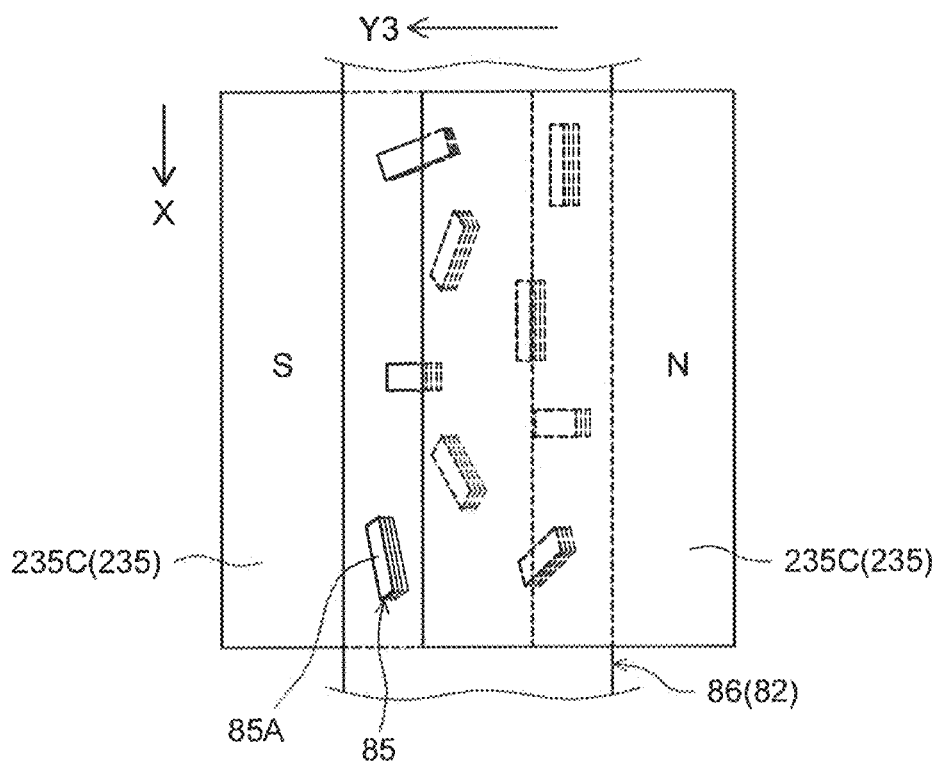

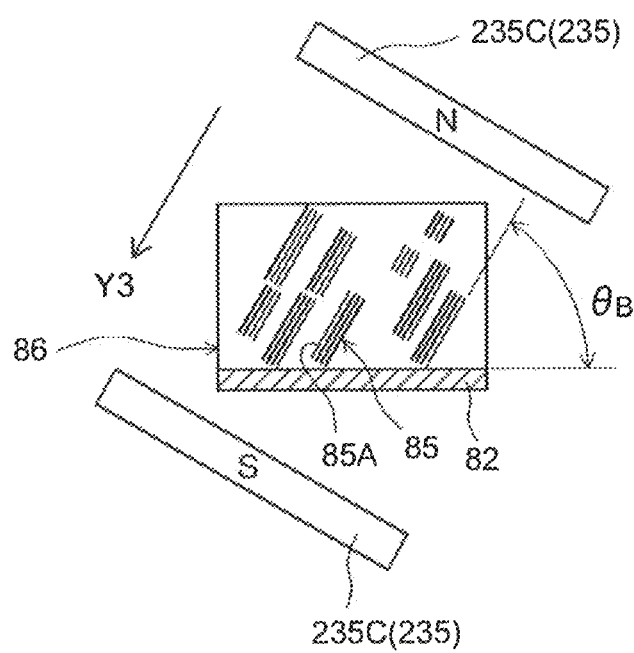

LITHIUM-ION SECONDARY CELL AND METHOD FOR MANUFACTURING SAME

CROSS-REFERENCE TO RELATED APPLICATIONS

This application is a national phase application of International Application No. PCT/JP2011/053570, filed Feb. 18, 2011, the content of which is incorporated herein by reference.

TECHNICAL FIELD

The present invention relates to a lithium-ion secondary cell and a method for manufacturing the lithium-ion secondary cell. The present invention particularly relates to a structure of a negative electrode for a lithium-ion secondary cell suitable for use as a power supply for vehicles and a method for forming such a structure.

BACKGROUND ART

Lithium-ion secondary cells include a positive electrode, a negative electrode and a liquid electrolyte which intermediates the electrodes and are charged and discharged by transfer of lithium ions between the positive and negative electrodes via the liquid electrolyte containing an electrolyte component such as a lithium salt. Typical negative electrodes in this type of lithium-ion secondary cells contain a negative electrode active material which can reversibly store and release lithium ions. The negative electrode active material is mainly various carbon materials such as graphite materials. Graphite has a laminar crystalline structure and allows charge and discharge by storing lithium ions to interlayers and releasing lithium ions from interlayers.

When a current collector is coated with a composition prepared in a paste-like form containing graphite as a negative electrode active material (the paste composition includes a slurry composition and an ink composition; hereinafter the paste composition is merely referred to as "composition") to form a negative electrode, graphite tends to be arranged such that the layers of graphite ((002) planes) are parallel to the surface (plane having a broader width) of the current collector. Therefore edge parts (edges of multiple layers) of graphite may be arranged approximately parallel to the current collector, and storaging lithium ions to interlayers and releasing lithium ions from interlayers may not be smoothly carried out during charge and discharge. Patent Literature 1 may be mentioned as the conventional art that sought to address such a problem. Patent Literature 1 discloses a technique for arranging layers of graphite so as to be perpendicular to a current collector by applying a magnetic field to a composition. In addition, Patent Literature 2 may be mentioned as the conventional art relating to the negative electrode of lithium-ion secondary cells.

CITATION LIST

Patent Literature

Patent Literature 1: Japanese Patent Application Publication No. 2003-197189
Patent Literature 2: Japanese Patent Application Publication No. 2006-252945

SUMMARY OF INVENTION

Technical Problem

According to the technique disclosed in Patent Literature 1, although layers of graphite (namely corresponding to (002) planes parallel to graphite layers) in the negative electrode can be arranged perpendicular to the current collector, the layers of graphite are randomly arranged (in multiple directions) relative to the elongated current collector. Therefore when graphite is shrunk during discharge of a lithium-ion secondary cell having a wound electrode assembly containing the elongated negative electrode, an electrolyte component (liquid electrolyte) such as a lithium salt in graphite may flow along the winding axis direction of the electrode assembly and lost from the negative electrode (electrode assembly), resulting in an increase in internal resistance of the negative electrode (electrode assembly) due to a decrease of the electrolyte component in the negative electrode (electrode assembly).

Thus an object of the present invention, which has been achieved in order to solve the above conventional problem, is to provide a lithium-ion secondary cell which can prevent loss of the electrolyte component such as a lithium salt from the negative electrode and suppress an increase in internal resistance during discharge of the lithium-ion secondary cell, and a method for manufacturing the secondary cell.

Solution to Problem

In order to achieve the above object, the present invention provides a lithium-ion secondary cell having a wound electrode assembly including a positive electrode and a negative electrode that are wound with a separator interposed therebetween, and a liquid electrolyte. Specifically, in the lithium-ion secondary cell disclosed herein, the negative electrode includes an elongated negative electrode current collector, and a negative electrode mixture layer that is formed on the surface of the negative electrode current collector and contains at least a graphite material. The graphite material in the negative electrode mixture layer is arranged such that a (002) plane of at least 50 mass % of the graphite material is perpendicular to the surface (plane having a broader width) of the negative electrode current collector and parallel to the longitudinal direction of the elongated negative electrode current collector.

The term "(002) plane of the graphite material" as used herein refers to the layer (plane parallel to graphite layers) of the graphite material (graphite crystal) having a laminar structure, which is parallel to graphene sheets forming the graphite material.

The lithium-ion secondary cell provided by the present invention includes the negative electrode mixture layer containing the graphite material and at least 50 mass % (e.g. 70 mass % or more, preferably 80 mass % or more, more preferably 90 mass % or more) of the graphite material is arranged (aligned) such that the (002) plane thereof is perpendicular to the surface of the negative electrode current collector and parallel to the longitudinal direction of the negative electrode current collector.

By aligning the (002) plane of the graphite material in the negative electrode mixture layer of the negative electrode along the predetermined direction as described above, loss of the electrolyte component from the negative electrode can be effectively prevented during discharge of a lithium-ion secondary cell even when the electrolyte component (liquid electrolyte) such as a lithium salt existing in the graphite material is transferred from the graphite material due to the shrinkage of the graphite material. Because the electrolyte component moves along the longitudinal direction of the negative electrode (negative electrode current collector) and has suppressed movement in the width direction (winding axis direction). Thereby an increase in internal resistance due to the loss of the electrolyte component such as a lithium salt can be suppressed. It is particularly useful to use the graphite material having a median diameter ($D_{50}$) of 5 μm to 20 μm according to the particle size distribution measured based on the laser diffraction and scattering method.

According to another aspect of the present invention for achieving the above object, a method for manufacturing a lithium-ion secondary cell having a wound electrode assembly including a positive electrode and a negative electrode that are wound with a separator interposed therebetween, the positive electrode including a positive electrode mixture layer formed on a positive electrode current collector, the negative electrode including a negative electrode mixture layer formed on a negative electrode current collector, and a liquid electrolyte is provided. Specifically, the method for manufacturing a lithium-ion secondary cell disclosed herein includes: mixing and kneading at least a graphite material with a predetermined solvent to prepare a paste composition for negative electrode mixture layer formation; coating the surface of an elongated negative electrode current collector with the prepared composition; and applying a magnetic field to the coated composition to form the negative electrode mixture layer in which the graphite material contained in the composition is arranged such that the (002) plane of at least 50 mass % of the graphite material is perpendicular to the surface of the elongated negative electrode current collector and parallel to the longitudinal direction of the negative electrode current collector. When forming the negative electrode mixture layer, a magnetic field is first applied that generates magnetic field lines along a current collector width direction that is defined as the direction perpendicular to the longitudinal direction of the elongated negative electrode current collector as well as the direction oriented from one long side of the negative electrode current collector toward the other long side, and then the direction of the magnetic field lines is continuously varied so that a magnetic field is applied that has magnetic field lines along a current collector perpendicular direction that is defined as the direction perpendicular to the surface of the negative electrode current collector, thereby displacing the graphite material such that the (002) plane of the graphite material contained in the composition is perpendicular to the surface of the negative electrode current collector and parallel to the longitudinal direction of the negative electrode current collector.

The phrase "the direction of the magnetic field lines is continuously varied" as used herein includes that the direction of the magnetic field lines is continuously varied in a single step from one direction to another desired direction and that the direction of the magnetic field lines is varied stepwise from one direction to another desired direction.

According to the method for manufacturing a lithium-ion secondary cell of the present invention, the magnetic field is continuously varied so as to vary the direction of the magnetic field lines from the current collector width direction to the current collector perpendicular direction, thereby arranging the graphite material contained in the composition coated on the elongated negative electrode current collector such that the (002) plane of at least 50 mass % (e.g. 70 mass % or more, preferably 80 mass % or more, more preferably 90 mass % or more) of the graphite material is perpendicular to the surface (plane having a broader width) of the negative electrode current collector and parallel to the longitudinal direction of the negative electrode current collector. By controlling the magnetic field applied to the composition coating the surface of the negative electrode current collector as described above, the graphite material in the composition can be displaced and arranged regularly.

In a preferred aspect of the manufacturing method disclosed herein, coating with the composition is performed by moving the elongated negative electrode current collector in a predetermined direction and continuously coating the surface of the moving negative electrode current collector with the composition. Application of the magnetic field to the coated composition includes application of the magnetic field with a magnetic field generator that is disposed along the negative electrode current collector coated with the composition and moving in the predetermined direction such that the direction of magnetic field lines continuously varies from the current collector width direction to the current collector perpendicular direction toward downstream of the negative electrode current collector from upstream thereof.

According to such a configuration, the negative electrode can be continuously manufactured that contains the negative electrode mixture layer containing the regularly aligned graphite material.

In another preferred aspect of the manufacturing method disclosed herein, the magnetic field generator is a plurality of magnets or a plurality of coils which is respectively disposed at gradually varying angles such that the direction of the magnetic field lines varies from the current collector width direction to the current collector perpendicular direction toward downstream of the negative electrode current collector from upstream thereof.

According to such a configuration in which the magnetic field generator used is a plurality of magnets or coils, the negative electrode can be easily manufactured that contains the negative electrode mixture layer containing the regularly aligned graphite materials.

In another preferred aspect of the manufacturing method disclosed herein, the composition has a solid content ratio of 40 mass % to 55 mass %, provided that the total amount of the composition is 100 mass %.

According to such a configuration, displacement of the graphite material is facilitated upon application of the magnetic field to the composition coating the negative electrode current collector such that the (002) plane of the graphite material in the composition is perpendicular to the surface of the negative electrode current collector and parallel to the longitudinal direction of the negative electrode current collector.

In another preferred aspect of the manufacturing method disclosed herein, during formation of the negative electrode mixture layer, the composition is dried while a magnetic field having magnetic field lines oriented to the current collector perpendicular direction is applied to the composition.

According to such a configuration, when the negative electrode mixture layer is formed, the (002) plane of the graphite material in the negative electrode mixture layer is more securely perpendicular to the surface of the negative electrode current collector and parallel to the longitudinal direction of the negative electrode current collector.

The thus manufactured lithium-ion secondary cell can exhibit further superior cell performances (typically decreased internal resistance) because at least 50 mass % of the graphite material in the negative electrode mixture layer is regularly aligned as described above. The lithium-ion secondary cell can be, as it has superior cell performances, suitably used particularly as a power supply for motors (electric motors) mounted on vehicles such as automobiles. Accordingly the present invention provides a vehicle (typically an automobile, particularly an automobile having an electric motor such as hybrid, electric and fuel cell cars) having the secondary cell (which may be an assembly battery containing a plurality of secondary cells connected in series) as a power supply.

BRIEF DESCRIPTION OF DRAWINGS

FIG. 7A a plan view which schematically shows the structure of a negative electrode during the manufacturing process in a method for manufacturing a negative electrode according to one embodiment of the present invention;

FIG. 8A is a plan view which schematically shows the structure of a negative electrode during the manufacturing process in a method for manufacturing a negative electrode according to one embodiment of the present invention;

FIG. 9A is a plan view which schematically shows the structure of a negative electrode during the manufacturing process in a method for manufacturing a negative electrode according to one embodiment of the present invention;

FIG. 9B is a section view taken along line 9B-9B of FIG. 5;

DESCRIPTION OF EMBODIMENTS

Preferred embodiments of the present invention are illustrated hereinbelow. The matters which are not particularly specified herein but are necessary for carrying out the present invention may be understood as design choices based on the conventional technique in the art by a person skilled in the art. The present invention can be carried out based on the contents disclosed herein and a common technical knowledge in the art.

A preferred aspect of the method for manufacturing a lithium-ion secondary cell disclosed herein is first described.

Figure 4:
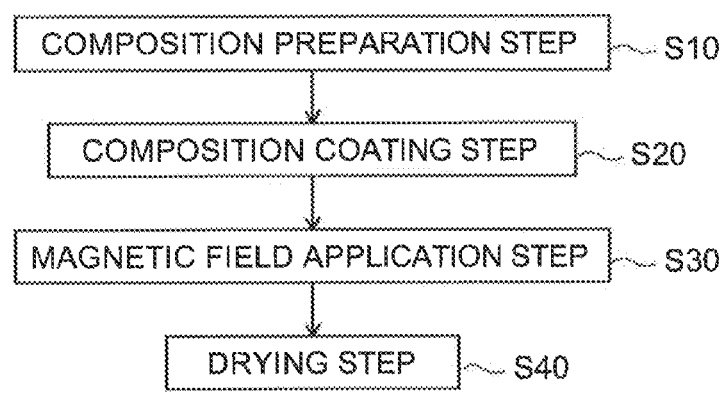
FIG. 4 is a flow chart illustrating a method for manufacturing a lithium-ion secondary cell according to one embodiment of the present invention.
Figure 5:
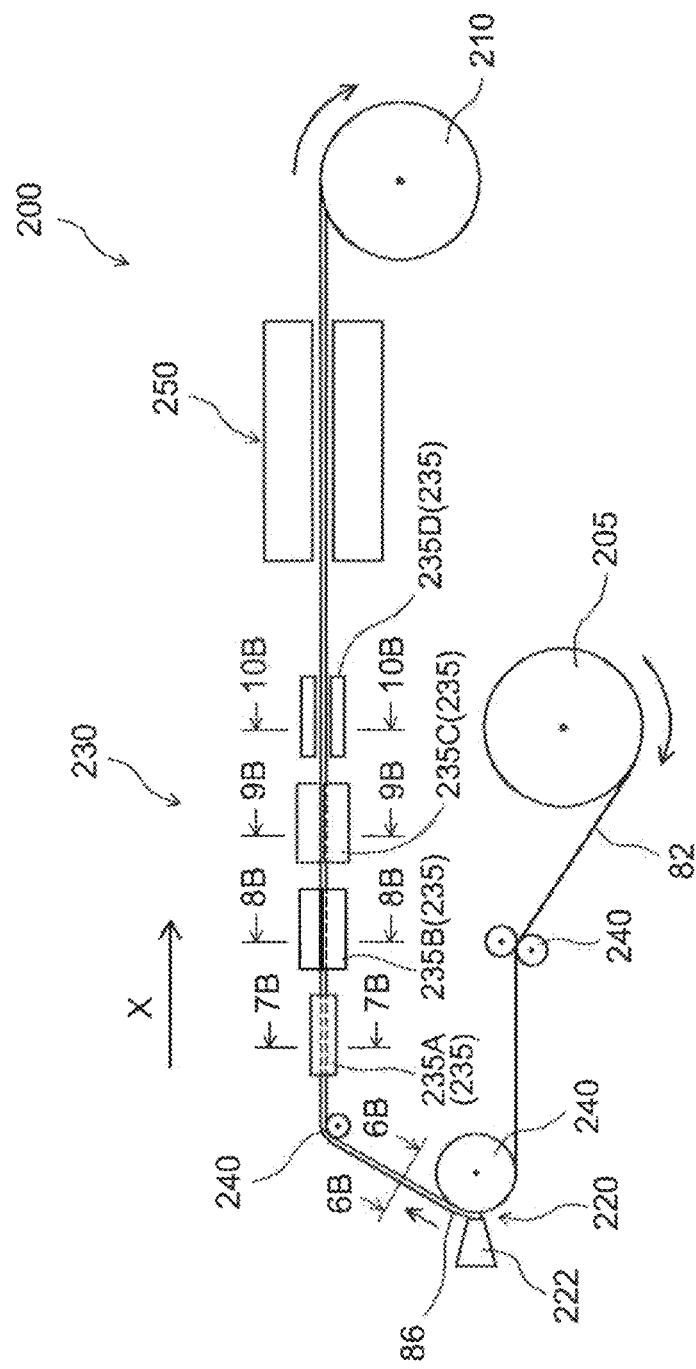
FIG. 5 is a view schematically illustrating the approximate configuration of a negative electrode manufacturing device according to one embodiment of the present invention.

The method for manufacturing a lithium-ion secondary cell disclosed herein comprises, as shown in FIG. 4, a composition preparation step (step S10), a composition coating step (step S20), a magnetic field application step (step S30) and a drying step (step S40). FIG. 5 is a view showing a manufacturing device that realizes a method for manufacturing a negative electrode used for the lithium-ion secondary cell. As shown in FIG. 5, the negative electrode manufacturing device 200 according to the present embodiment generally comprises a feeding roll 205, a composition coating member 220, a magnetic field application member 230, a drying furnace 250 and a collecting roll 210. A negative electrode current collector 82 is supplied from a feeding roll 205 and guided by a guide 240. The negative electrode current collector 82 can travel along a predetermined route while undergoing the above steps, and is collected at the collecting roll 210.

The composition preparation step (S10) is first described. The composition preparation step includes mixing and kneading at least a graphite material with a predetermined solvent to prepare a paste composition for negative electrode mixture layer formation (hereinafter also merely referred to as a "paste"). In this step, a paste is prepared which contains, for example, the graphite material and a binding agent (binder) dissolved in the predetermined solvent.

The graphite material (negative electrode active material) may include natural graphite, artificial graphite (synthetic graphite) and the like that can reversibly store and release lithium ions. The graphite material preferably has a median diameter ($D_{50}$) of approximately 5 μm to 20 μm according to the particle size distribution measured based on the laser diffraction and scattering method. When the graphite material has a median diameter of far over 20 μm, the time required for diffusion of lithium ions into the central part of the graphite material may be excessively increased, resulting in decreased effective capacity of the negative electrode. When the graphite material has a median diameter of far below 5 μm, the side reaction rate at the surface of the graphite material may be increased, resulting in increased irreversible capacity of the lithium-ion secondary cell.

The binding agent appropriately employed may be the same as the binding agents used for negative electrodes of conventional lithium-ion secondary cells. When an aqueous composition is prepared, the binding agent may preferably be a polymer material which is dissolved or dispersed in water. The polymer material that is dissolved in water (water-soluble) may be exemplified by cellulose polymers such as carboxymethylcellulose (CMC), methylcellulose (MC), cellulose acetate phthalate (CAP) and hydroxypropyl methylcellulose (HPMC); polyvinyl alcohol (PVA) and the like. The polymer material that is dispersed in water (water-dispersible) may be exemplified by fluororesins such as polytetrafluoroethylene (PTFE); vinyl acetate copolymers; rubbers such as styrene butadiene rubbers (SBRs). The exemplified polymer materials may be used for, in addition to providing the function as a binding agent, providing the function as a thickening agent or other additives to the composition.

The term "aqueous composition" as used herein is a general idea referring to a composition containing the predetermined solvent (dispersant) that is water or a mixed solvent mainly containing water (aqueous solvent). A solvent which may be contained in the mixed solvent other than water may be one or two or more appropriately selected from organic solvents (lower alcohols, lower ketones and the like) which can be homogeneously mixed with water.

The graphite material and the binding agent can be mixed (kneaded) in the solvent using, for example, an appropriate kneading machine (planetary mixer, homo disper, Clearmix, Filmix and the like). Upon preparation of the paste composition, the graphite material and the binding agent may be kneaded in a small amount of the solvent so as to give a thick paste and then the resulting kneaded material may be diluted in an appropriate amount of the solvent.

The paste composition has a solid content ratio of about 30 mass % to 65 mass %, preferably about 40 mass % to 55 mass %. The proportion of the graphite material in the whole solid matters of the composition is about 80 mass % to 100 mass %, preferably 95 mass % to 100 mass %. The proportion of the binding agent in the whole solid matters of the composition may be, for example, about 0.1 mass % to 5 mass % and is normally preferred to be about 0.1 mass % to 3 mass %. When the thickening agent is used, the proportion of the thickening agent in the whole solid matters of the composition may be, for example, about 0.1 mass % to 5 mass % and is normally preferred to be about 0.1 mass % to 3 mass %.

The composition coating step (S20) is now described. The composition coating step includes coating the surface of the elongated negative electrode current collector with the prepared composition.

As shown in FIG. 5, the composition coating member 220 according to the present embodiment is a die coater. The composition 86 thus prepared is supplied to a die 222 of the composition coating member 220 and the surface of the elongated negative electrode current collector 82 which has been sent out from the feeding roll 205 is coated with the composition 86.

The negative electrode current collector 82 used is preferably, similar to current collectors used for negative electrodes of conventional lithium-ion secondary cells, a conductive member formed by a metal having preferable conductivity. For example, copper materials, nickel materials, elongated sheet-shaped alloy metal materials mainly containing copper or nickel may be used. The sheet-shaped negative electrode current collector 82 has a thickness of about 10 μm to 30 μm.

Although the composition coating member 220 of the negative electrode manufacturing device 200 according to the present embodiment is a die coater, this does not limit the present invention. The negative electrode current collector 82 can be coated with the composition 86 in a similar manner as preparation of electrodes (negative electrodes) for conventional and general lithium-ion secondary cells. For example, well-known appropriate coating devices like a slit coater, a comma coater or a gravure coater may be alternatively used.

The magnetic field applying step (S30) is now described. The magnetic field applying step includes applying a magnetic field to the coated composition (composition which contains the solvent and is not dried yet). The application of a magnetic field is carried out by first applying a magnetic field which generates magnetic field lines along a current collector width direction that is defined as the direction perpendicular to the longitudinal direction of the elongated negative electrode current collector as well as the direction oriented from one long side of the negative electrode current collector toward the other long side, and then continuously varying the direction of the magnetic field lines so that a magnetic field is applied that has magnetic field lines along a current collector perpendicular direction that is defined as the direction perpendicular to the surface (plane having a broader width) of the negative electrode current collector.

As shown in FIG. 5, the magnetic field application member 230 of the negative electrode manufacturing device 200 according to the present embodiment comprises multiple pairs of opposing magnetic field generators 235 provided so as to sandwich the negative electrode current collector 82. The magnetic field generator 235 is not particularly limited as far as it can generate a magnetic field and may include, for example, a permanent magnet, a magnet coil and the like.

Figure 7B:
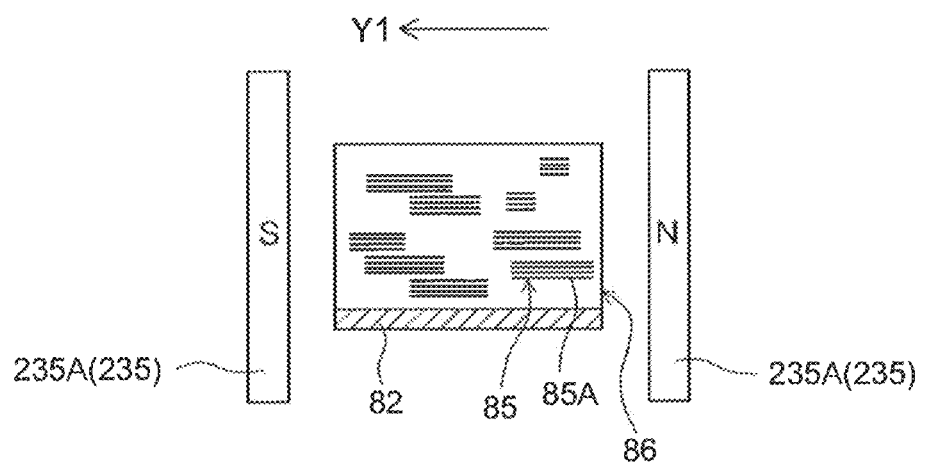
FIG. 7B is a section view taken along line 7B-7B of FIG. 5.

In the magnetic field application member 230 of the negative electrode manufacturing device 200 according to the present embodiment, magnetic field generators 235A, 235B, 235C and 235D are disposed at gradually varying angles toward downstream of the negative electrode current collector 82 from upstream thereof (in the direction of the arrow X of FIG. 5) so as to vary the direction of the magnetic field lines from the current collector width direction to the current collector perpendicular direction. Namely, as shown in FIGS. 7A and 7B, a pair of magnetic field generators 235A is disposed along the longitudinal direction (direction of the arrow X) of the negative electrode current collector 82 so that a plane having a broader width of the magnetic field generators 235A is perpendicular to a plane having a broader width of the negative electrode current collector 82. When the magnetic field generators 235A are disposed as above, a magnetic field can be applied to the composition 86 coating the surface of the negative electrode current collector 82 which generates magnetic field lines along the current collector width direction that is defined as the direction perpendicular to the longitudinal direction of the elongated negative electrode current collector 82 as well as the direction oriented from one long side of the negative electrode current collector 82 toward the other long side (direction of the arrow Y1 shown in FIGS. 7A and 7B).

Figure 8B:
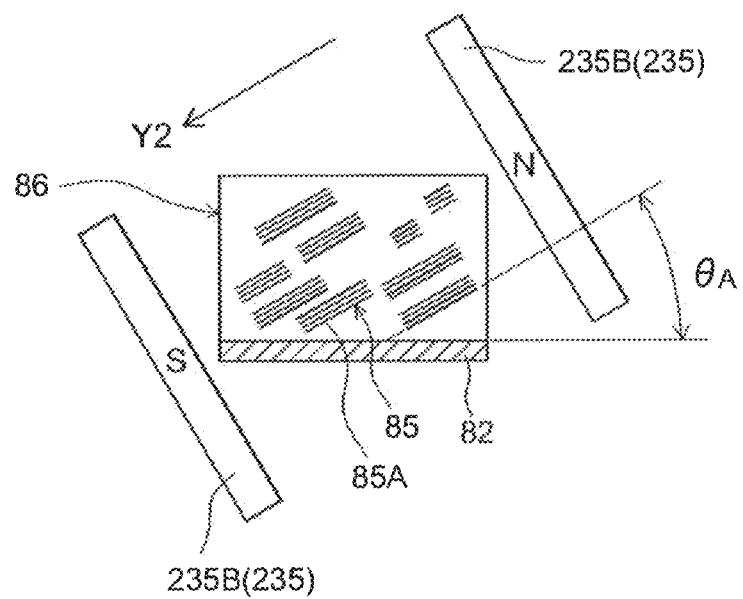
FIG. 8B is a section view taken along line 8B-8B of FIG. 5.

As shown in FIGS. 8A and 8B, a pair of magnetic field generators 235B is disposed along the longitudinal direction (direction of the arrow X) of the negative electrode current collector 82 so that a line being perpendicular to a plane having a broader width of the magnetic field generators 235B forms an angle $\theta_A$ (e.g. about 20 degrees to 40 degrees; it is 30 degrees in the present embodiment) with a plane having a broader width of the negative electrode current collector 82. When the magnetic field generators 235B are disposed as above, a magnetic field can be applied to the composition 86 coating the surface of the negative electrode current collector 82 which generates magnetic field lines along the direction inclined at OA relative to the negative electrode current collector 82 (direction of the arrow Y2 shown in FIGS. 8A and 8B).

As shown in FIGS. 9A and 9B, a pair of magnetic field generators 235C is disposed along the longitudinal direction (direction of the arrow X) of the negative electrode current collector 82 so that a line being perpendicular to a plane having a broader width of the magnetic field generators 235C forms an angle $\theta_B$ (e.g. about 50 degrees to 70 degrees; it is 60 degrees in the present embodiment) with a plane having a broader width of the negative electrode current collector 82.

When the magnetic field generators 235C are disposed as above, a magnetic field can be applied to the composition 86 coating the surface of the negative electrode current collector 82 which generates magnetic field lines along the direction inclined at $\theta_B$ relative to the negative electrode current collector 82 (direction of the arrow Y3 shown in FIGS. 9A and 9B).

Figure 10A:
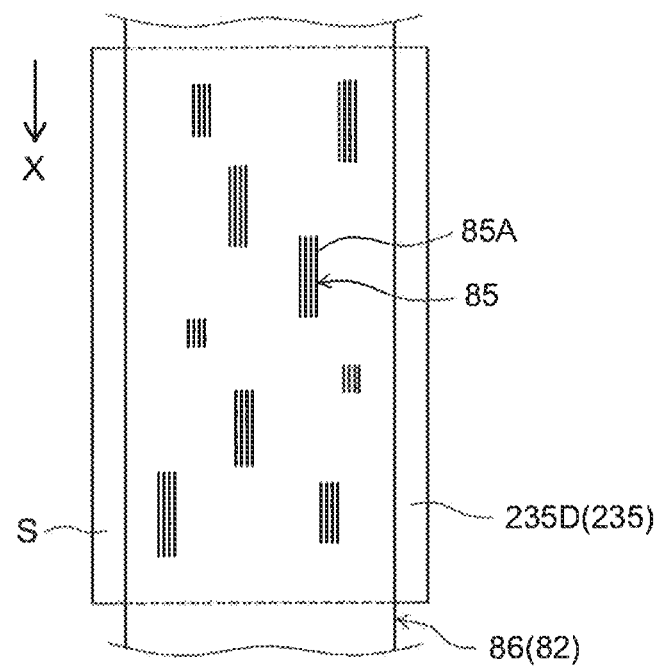
FIG. 10A is a plan view which schematically shows the structure of a negative electrode during the manufacturing process in a method for manufacturing a negative electrode according to one embodiment of the present invention.
Figure 10B:
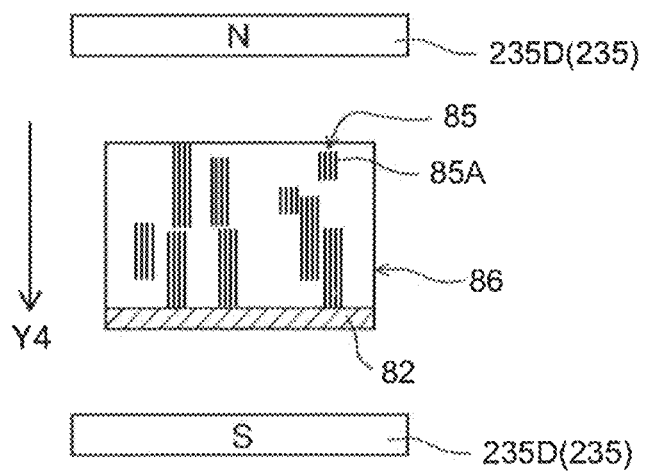
FIG. 10B is a section view taken along line 10B-10B of FIG. 5.

As shown in FIGS. 10A and 10B, a pair of magnetic field generators 235D (one of the magnetic field generators is not shown in FIG. 10A) is disposed along the longitudinal direction (direction of the arrow X) of the negative electrode current collector 82 so that a plane having a broader width of the magnetic field generators 235D is parallel to the surface (plane having a broader width) of the negative electrode current collector 82. When the magnetic field generators 235D are disposed as above, a magnetic field can be applied to the composition 86 coating the surface of the negative electrode current collector 82 which generates magnetic field lines along the current collector perpendicular direction that is defined as the direction perpendicular to the surface (plane having a broader width) of the elongated negative electrode current collector 82 (the direction perpendicular to the plane of paper of FIG. 10A and direction of the arrow Y4 shown in FIG. 10B).

By providing the magnetic field generators 235A, 235B, 235C and 235D along the negative electrode current collector 82 as described above, magnetic fields that generate magnetic field lines in multiple predetermined directions can be applied to the graphite material (negative electrode active material) 85 contained in the composition 86 coating the negative electrode current collector 82. As a result, the graphite material 85 can be displaced by the magnetic fields and at least 50 mass % (e.g. 70 mass % or more, preferably 80 mass % or more, more preferably 90 mass % or more) of the graphite material can be aligned in a given direction.

Figure 6A:
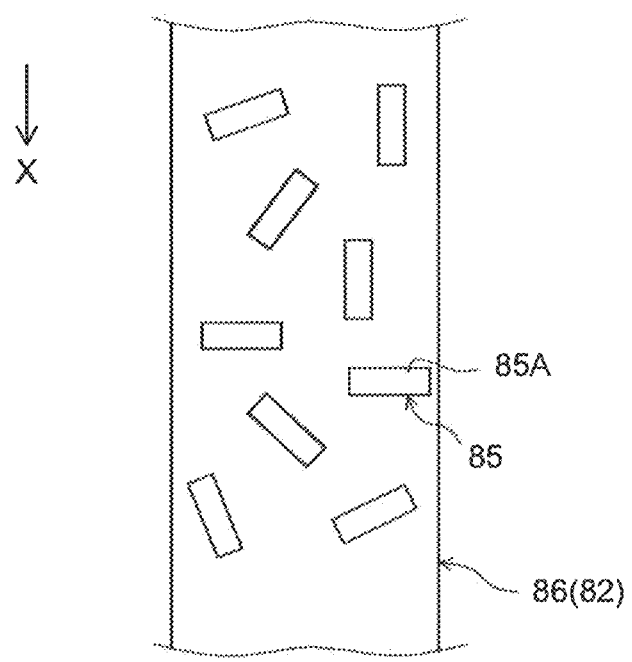
FIG. 6A is a plan view which schematically shows the structure of a negative electrode during the manufacturing process in a method for manufacturing a negative electrode according to one embodiment of the present invention.
Figure 6B:
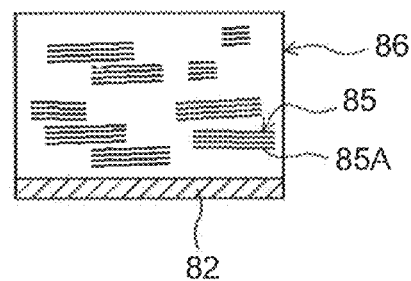
FIG. 6B is a section view taken along line 6B-6B of FIG. 5.

More specifically, as shown in FIGS. 6A and 6B, the graphite material 85 in the composition 86 coating the negative electrode current collector 82 is tend to be aligned such that the (002) plane 85A of the graphite material 85 is approximately parallel to the surface (plane having a broader width) of the negative electrode current collector 82. As shown in FIGS. 5, 7A and 7B, the negative electrode current collector 82 coated with the composition 86 is transferred to a region where the magnetic field generators 235A are disposed and the magnetic field generators 235A apply a magnetic field thereto which generates magnetic field lines along the current collector width direction. As a result, as shown in FIG. 7B, the graphite material 85 in the composition 86 can be displaced and arranged (aligned) such that the (002) plane 85A of at least 50 mass % of the graphite material is parallel to the negative electrode current collector 82.

As shown in FIGS. 5, 8A and 8B, the negative electrode current collector 82 comprising the composition 86 to which the magnetic field has been applied by the magnetic field generators 235A is then transferred to a region where the magnetic field generators 235B are disposed and the magnetic field generators 235B apply a magnetic field thereto which generates magnetic field lines along the direction inclined at $\theta_A$ relative to the negative electrode current collector 82. As a result, as shown in FIGS. 8A and 8B, the graphite material 85 in the composition 86 can be displaced and arranged (aligned) such that the (002) plane 85A of at least 50 mass % of the graphite material is inclined at $\theta_A$ relative to the negative electrode current collector 82.

As shown in FIGS. 5, 9A and 9B, the negative electrode current collector 82 comprising the composition 86 to which the magnetic field has been applied by the magnetic field generators 235B is then transferred to a region where the magnetic field generators 235C are disposed and the magnetic field generators 235C apply a magnetic field thereto which generates magnetic field lines along the direction inclined at $\theta_B$ relative to the negative electrode current collector 82. As a result, as shown in FIGS. 9A and 9B, the graphite material 85 in the composition 86 can be displaced and arranged (aligned) such that the (002) plane 85A of the graphite material is inclined at $\theta_B$ relative to the negative electrode current collector 82.

Finally, as shown in FIGS. 5, 10A and 10B, the negative electrode current collector 82 comprising the composition 86 to which the magnetic field has been applied by the magnetic field generators 235C is transferred to a region where the magnetic field generators 235D are disposed and the magnetic field generators 235D apply a magnetic field thereto which generates magnetic field lines along the current collector perpendicular direction. As a result, as shown in FIGS. 10A and 10B, the graphite material 85 in the composition 86 can be displaced and arranged (aligned) such that the (002) plane 85A of at least 50 mass % of the graphite material 85 is perpendicular to the plane having a broader width of the negative electrode current collector 82 and parallel to the longitudinal direction of the negative electrode current collector 82.

Figure 16A:
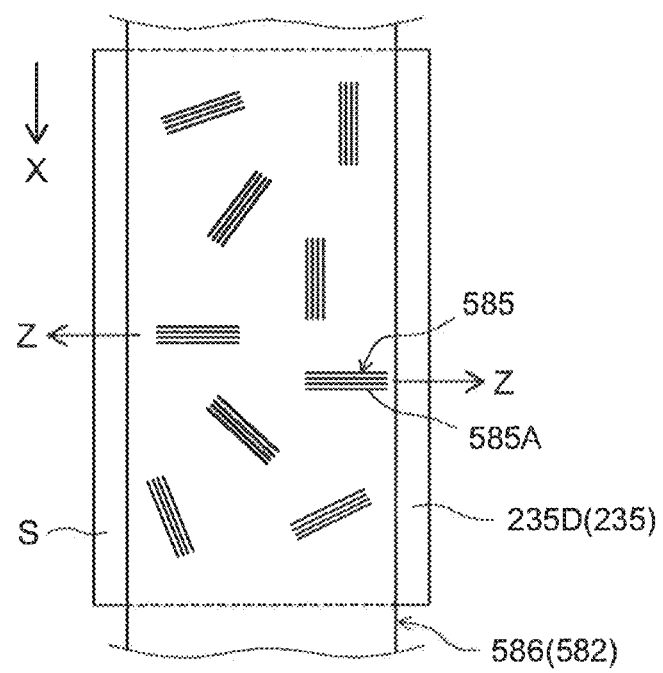
FIG. 16A is a plan view which schematically shows the structure of a negative electrode during the manufacturing process in a conventional method for manufacturing a negative electrode.
Figure 16B:
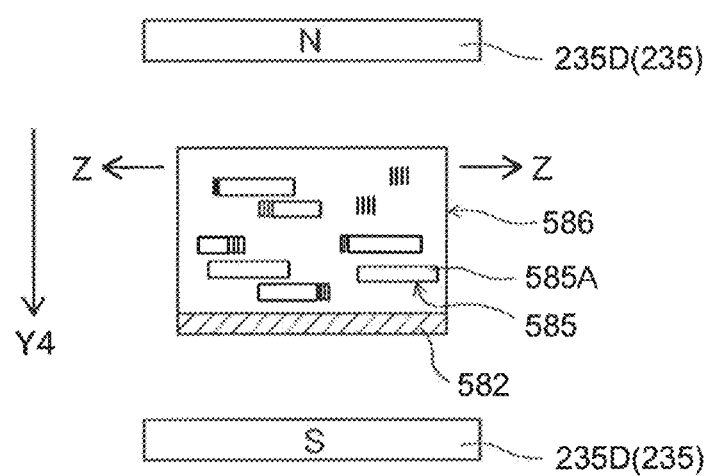
FIG. 16B is a section view which schematically shows the structure of a negative electrode manufactured according to a conventional method for manufacturing a negative electrode.

If a magnetic field is applied in this situation according to a conventional method that generates magnetic field lines along the current collector perpendicular direction so that a (002) plane 585A of a graphite material 585 in a composition 586 is perpendicular to the surface (plane having a broader width) of a negative electrode current collector 582, the (002) plane 585A of most of the graphite material 585 in the composition 586 is not arranged (aligned) to be parallel to the longitudinal direction of the negative electrode current collector 582 as shown in FIGS. 16A and 16B. Thus when a lithium-ion secondary cell is used (typically discharged) which comprises a wound electrode assembly comprising a negative electrode sheet which contains a negative electrode mixture layer obtained by drying the composition 586 and a positive electrode sheet that are wound together with a separator sheet, the shrinkage of the graphite material 585 results in transfer of the electrolyte component such as a lithium salt in the graphite material 585 along the width direction of the negative electrode current collector (direction of the arrow Z in FIGS. 16A and 16B; i.e. the winding axis direction). The thus transferred electrolyte component may flow out from the electrode assembly along the width direction of the negative electrode current collector 582, resulting in a significant increase in internal resistance of the electrode assembly due to a decrease of the electrolyte component in the electrode assembly.

On the other hand, as shown in FIGS. 10A and 10B, the (002) plane 85A of the graphite material 85 in the composition 86 according to the present embodiment is arranged (aligned) such that it is perpendicular to the surface (plane having a broader width) of the negative electrode current collector 82 and parallel to the longitudinal direction of the negative electrode current collector 82. Accordingly when the lithium-ion secondary cell is used (discharged) which comprises a wound electrode assembly comprising a negative electrode sheet which contains a negative electrode mixture layer obtained by drying the composition 86 and a positive electrode sheet that are wound together with a separator sheet, the shrinkage of the graphite material 85 results in transfer of the electrolyte component such as a lithium salt in the graphite material 85 along the longitudinal direction of the negative electrode current collector 82 and the direction perpendicular to the negative electrode current collector 82. Thus the electrolyte component is prevented from flowing out from the electrode assembly along the width direction of the negative electrode current collector 82 and an increase in internal resistance of the electrode assembly can be suppressed.

In the magnetic field application step, the intensity of the magnetic field to be applied to the composition 86 coating the negative electrode current collector 82 is, for example, about 0.3 T to 1 T, normally about 0.4 T to 0.6 T. The time for magnetic field application to the composition 86 from one magnetic field generator 235 is about 5 seconds to 2 minutes. The time of magnetic field application corresponds to the time during which the negative electrode current collector 82 passes through one magnetic field generator 235 from the upstream side to the downstream side in case of the present embodiment.

In the present embodiment, as shown in FIG. 5, a plurality of magnetic field generators 235A, 235B, 235C and 235D are disposed with intervals therebetween; however they may be disposed without intervals. In the present embodiment, four magnetic field generators are disposed at gradually varying angles; however the number of the magnetic field generators is not limited as far as the graphite material 85 can be arranged as described above. In the present embodiment, a plurality of magnetic field generators 235A, 235B, 235C and 235D are disposed along the longitudinal direction of the negative electrode current collector 82 so as to continuously (stepwise) vary the direction of magnetic field lines in order to vary the applied magnetic field from the one that generates magnetic field lines along the current collector width direction to the one that generates magnetic field lines along the current collector perpendicular direction; however, a similar magnetic field can be applied to the composition 86 by one magnetic field generator that is formed continuously (in a single step) in a spiral manner such that the angle between a plane having a broader width of the magnetic field generator and the surface (plane having a broader width) of the negative electrode current collector is varied from 90 degrees to 0 degrees toward downstream of the negative electrode current collector from upstream thereof. In the present embodiment, the magnetic field is applied to the composition 86 while the negative electrode current collector 82 is moving in a predetermined direction; however the present invention is not limited to this embodiment. For example, a magnetic field may be applied to the composition on a non-moving (still) negative electrode current collector by transferring a magnetic field generator itself so as to change the applied magnetic field from the one that generates magnetic field lines along the current collector width direction to the one that generates magnetic field lines along the current collector perpendicular direction.

The drying step (step S40) is now described. In the drying step, the composition to which the magnetic field has been applied is dried with appropriate means to form the negative electrode mixture layer. As shown in FIG. 5, the composition 86 to which the magnetic field has been applied passes through the drying furnace 250 and accordingly the composition 86 coating the negative electrode current collector 82 can be continuously dried. The drying temperature is for example about 100° C. to 180° C. and the drying duration is for example about 10 seconds to 120 seconds. Drying at 150° C. for 90 seconds is preferable. By removing the solvent from the composition 86, the negative electrode mixture layer 88 is formed. Accordingly a sheet-shaped negative electrode sheet (negative electrode) 84 onto which the negative electrode mixture layer 88 (see FIG. 3) is formed can be obtained, wherein the negative electrode mixture layer 88 contains the negative electrode current collector 82 onto which the graphite material is arranged such that the (002) plane 85A of at least 50 mass % of the graphite material is perpendicular to the surface (plane having a broader width) of the negative electrode current collector 82 and parallel to the longitudinal direction of the negative electrode current collector 82.

In the drying step, the composition 86 can be dried while a magnetic field is applied to the composition 86 which generates magnetic field lines along the current collector perpendicular direction. By drying the composition 86 while the magnetic field is applied to the composition 86, possible transfer of the graphite material 85 during the drying step can be prevented, resulting in maintenance of the alignment of the graphite material 85 in the composition 86 (namely the status in which the (002) plane 85A of the graphite material 85 is perpendicular to the plane having a broader width of the negative electrode current collector 82 and parallel to the longitudinal direction of the negative electrode current collector 82).

After formation of the negative electrode mixture layer 88, pressure may be applied, if required (compression). Compression can be carried out by well-known methods such as a roll press method or a flat press method.

The step of forming a positive electrode containing a positive electrode active material is now described. First a paste composition for positive electrode mixture layer formation containing the positive electrode active material, a conductive material, a binding agent and the like dispersed in a predetermined solvent is prepared.

The positive electrode active material is a material which can store and release lithium and may include lithium-containing compounds (e.g. lithium transition metal complex oxides) containing a lithium element and one or two or more transition metal elements. The positive electrode active material may include, for example, lithium-cobalt complex oxide ($LiCoO_2$), lithium-nickel complex oxide ($LiNiO_2$), lithium-manganese complex oxide ($LiMn_2O_4$); so-called binary lithium-containing complex oxides containing two kinds of transition metal elements such as nickel-cobalt type represented by $LiNi_xCo_{1-x}O_2$ ($0<x<1$), cobalt-manganese type represented by $LiCo_xMn_{1-x}O_2$ ($0<x<1$) and nickel-manganese type represented by $LiNi_xMn_{1-x}O_2$ ($0<x<1$) and $LiNi_xMn_{2-x}O_4$ ($0<x<2$); and ternary lithium-containing complex oxides containing three kinds of transition metal elements such as nickel-cobalt-manganese type.

The positive electrode active material used may be an olivine-type lithium phosphate represented by the general formula $LiMPO_4$, wherein M is at least one element among Co, Ni, Mn and Fe, including, for example, $LiFePO_4$, $LiMnPO_4$.

The binding agent appropriately employed may be the same as the binding agents used for positive electrodes of conventional lithium-ion secondary cells. When an aqueous composition is prepared, the binding agent appropriately employed may be the same as the binding agent used for the above negative electrode. When a solvent-based composition is prepared, a polymer material which can dissolve in an organic solvent (non-aqueous solvent) can be used such as polyvinylidene fluoride (PVDF) and polyvinylidene chloride (PVDC). The term "solvent-based composition" as used herein is a general idea referring to a composition mainly containing an organic solvent as a dispersant for the positive electrode active material. The organic solvent used may be, for example, N-methylpyrrolidone (NMP) and the like.

The conductive material may be any conductive material which is conventionally used for this type of lithium-ion secondary cells without particular limitation and may be, for example, carbon materials such as carbon powder and carbon fiber. Carbon powder used may be various carbon black (e.g. acetylene black, furnace black, ketjen black etc.), graphite powder and the like which may be used alone or two or more in combination.

A positive electrode current collector is then coated with the thus prepared composition for positive electrode mixture layer formation which is dried to form a positive electrode mixture layer optionally followed by compression (pressing). Thereby the positive electrode which comprises the positive electrode mixture layer containing the positive electrode current collector and the positive electrode active material can be prepared.

The positive electrode current collector used is preferably, similar to current collectors used for positive electrodes of conventional lithium-ion secondary cells, a conductive member formed by a metal having preferable conductivity. For example, aluminum materials or alloy materials mainly including aluminum materials may be used. The shape of the positive electrode current collector may be the same as the shape of the negative electrode current collector.

The step of assembling a battery assembly by placing the negative electrode (negative electrode sheet) 84 manufactured with the above method and the prepared positive electrode together with a liquid electrolyte in a battery case is now described. The positive and negative electrodes are stacked together with in total two separator sheets and wound to prepare a wound electrode assembly. The wound electrode assembly is then placed in the battery case (e.g. a flat, rectangular solid-shaped case) and the liquid electrolyte is injected in the battery case. The opening of the battery case is then sealed with a lid to obtain the battery assembly. The liquid electrolyte used may be the same as non-aqueous liquid electrolytes used for conventional lithium-ion secondary cells without limitation. The non-aqueous liquid electrolytes typically contain a supporting salt in an appropriate non-aqueous solvent. The non-aqueous solvent used may be, for example, one or two or more selected from EC, PC, DMC, DEC, EMC and the like. The supporting salt (supporting electrolyte component) used may include, for example, lithium salts such as $LiPF_6$ and $LiBF_4$. The separator sheet may include those formed by porous polyolefin resins and the like.

An embodiment of the thus assembled lithium-ion secondary cell is now described by referring to figures. However, it is not intended that the present invention is limited to this embodiment. Namely, the shape (outer shape and size) of the assembled lithium-ion secondary cell is not particularly limited as far as the graphite material 85 in the negative electrode mixture layer 88 is arranged such that the (002) plane 85A of at least 50 mass % of the graphite material 85 is perpendicular to the surface (plane having a broader width) of the negative electrode current collector 82 and parallel to the longitudinal direction of the elongated negative electrode current collector 82. In the following embodiment described, a lithium-ion secondary cell containing a wound electrode assembly and a liquid electrolyte in a rectangular-shaped battery case is exemplified.

In the following figures, members and positions which provide same effects may be marked with the same symbols and redundant explanations may be omitted. The dimensions (length, width, thickness etc.) in the figures do not necessarily reflect the actual dimensions.

Figure 1:
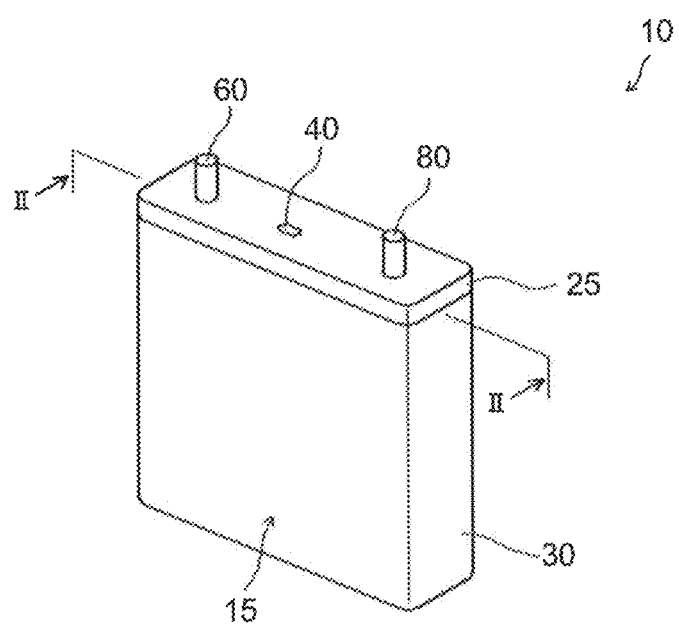
FIG. 1 is a perspective view which schematically shows the outer shape of a lithium-ion secondary cell according to one embodiment of the present invention.
Figure 2:
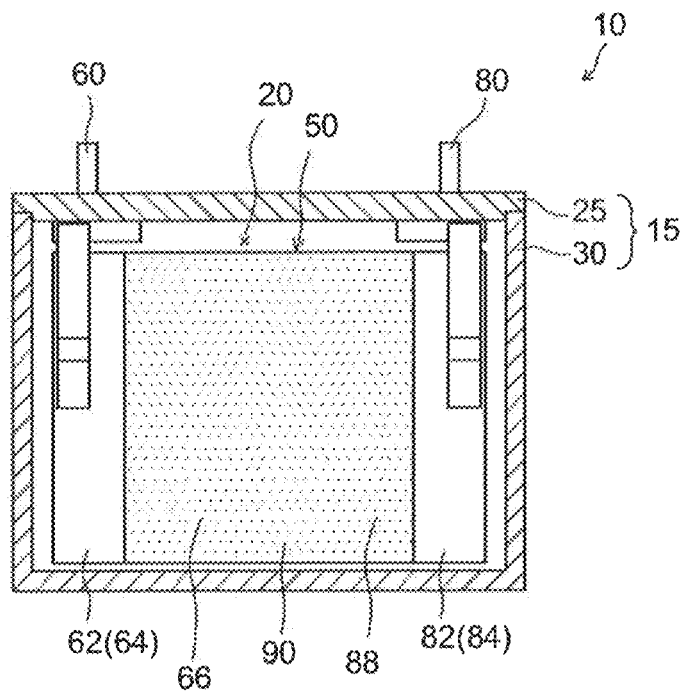
FIG. 2 is a section view taken along line II-II of FIG. 1.
Figure 3:
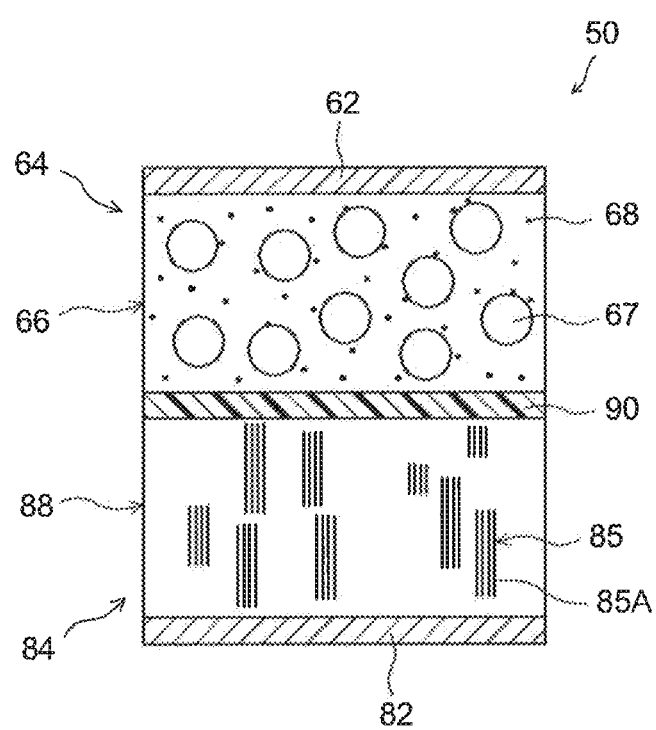
FIG. 3 is a section view which schematically shows the structure of an electrode assembly of a lithium-ion secondary cell according to one embodiment of the present invention.

FIG. 1 is a perspective view schematically showing the lithium-ion secondary cell 10 according to the present embodiment. FIG. 2 is a vertical section view taken along line II-II of FIG. 1. FIG. 3 is a section view of the wound electrode assembly 50 according to the present embodiment.

As shown in FIG. 1, the lithium-ion secondary cell 10 according to the present embodiment comprises a battery case 15 made of a metal (resin or laminate film may also be suitable). The case (outer container) 15 comprises a case body 30 having a flat rectangular solid shape with a top end being open and a lid 25 covering the opening 20. The opening 20 of the case body 30 is sealed with the lid 25 by welding and the like. The upper face of the case 15 (i.e. the lid 25) is provided with a positive electrode terminal 60 which is electrically connected to a positive electrode sheet (positive electrode) 64 of the wound electrode assembly 50 and a negative electrode terminal 80 which is electrically connected to a negative electrode sheet 84 of the electrode assembly. The lid 25 is also provided with, similar to the cases for conventional lithium-ion secondary cells, a safety valve 40 for discharging the gas generated in the case 15 upon battery troubles. The case 15 comprises the flat-shaped wound electrode assembly 50, which is prepared by stacking the positive electrode sheet 64 and the negative electrode sheet 84 with in total two separator sheets 90, winding the same and squashing the wound assembly from both sides to crush the same, and the liquid electrolyte.

When carrying out stacking as described above, the positive electrode sheet 64 and the negative electrode sheet 84 are stacked together, as shown in FIG. 2, with some shift in the width direction so that a positive electrode mixture layer non-forming part (i.e. a part where the positive electrode current collector 62 is exposed without the positive electrode mixture layer 66 being formed thereon) of the positive electrode sheet 64 and a negative electrode mixture layer non-forming part (i.e. a part where the negative electrode current collector 82 is exposed without the negative electrode mixture layer 88 being formed thereon) of the negative electrode sheet 84 are protruded from both sides along the width direction of the separator sheets 90. As a result, in the lateral direction relative to the winding direction of the wound electrode assembly 50, the electrode mixture layer non-forming parts of the positive electrode sheet 64 and negative electrode sheet 84, respectively, are protruded outward from a winding core portion (i.e. a portion where the positive electrode mixture layer forming part of the positive electrode sheet 64, a negative electrode mixture layer forming part of the negative electrode sheet 84 and two separator sheets 90 are closely wound). The protruded part on the positive electrode side is joined to the positive electrode terminal 60 in order to electrically connect the positive electrode sheet 64 of the flat-shaped wound electrode assembly 50 and the positive electrode terminal 60. Similarly, the protruded part on the negative electrode side is joined to the negative electrode terminal 80 in order to electrically connect the negative electrode sheet 84 and the negative electrode terminal 80. The positive and negative electrode terminals 60 and 80 and the positive and negative electrode current collectors 62 and 82 may be respectively joined, for example, by ultrasonic welding, resistance welding and the like.

FIG. 3 is a schematic section view which magnifies the central part of the wound electrode assembly 50 in the winding axis direction. As shown in FIG. 3, the separator sheet 90 is disposed between the positive electrode sheet 64 containing the positive electrode current collector 62 onto which the positive electrode mixture layer 66 containing the positive electrode active material (e.g. lithium cobalt oxide) 67 and the conductive material 68 is formed and the negative electrode sheet 84 containing the negative electrode current collector 82 onto which the negative electrode mixture layer 88 containing the graphite material 85 is formed. Both mixture layers 66 and 88 and the separator sheet 90 are soaked in the liquid electrolyte containing the lithium salt (not shown). In the present embodiment, the graphite material 85 in the negative electrode mixture layer 88 is arranged such that the (002) plane 85A of at least 50 mass % of the graphite material is perpendicular to the surface (plane having a broader width) of the negative electrode current collector 82 and parallel to the longitudinal direction (direction perpendicular to the plane of paper of FIG. 3) of the negative electrode current collector 82. Thus even when the graphite material 85 contained in the negative electrode mixture layer 88 is shrunk upon discharge of the lithium-ion secondary cell 10 (see FIG. 1), the electrolyte component such as a lithium salt existing in the graphite material 85 is prevented from flowing out from the electrode assembly 50 along the width direction (winding axis direction) of the electrode assembly 50. Namely an increase in internal resistance of the electrode assembly due to a decrease of the electrolyte component (liquid electrolyte) such as a lithium salt can be suppressed.

Examples relating to the present invention are now described hereinbelow. However, it is not intended that the present invention is limited to these Examples.

Example 1

Natural graphite (negative electrode active material), SBR as a binding agent and CMC as a thickening agent were weighed at a mass ratio of 98:1:1 and dispersed in ion exchange water to prepare a paste composition for negative electrode mixture layer formation. A copper foil (negative electrode current collector) having a thickness of 10 μm was coated with the composition at an application amount of 4 mg/cm$^2$ per side and a magnetic field was applied to the coated composition. The composition after magnetic field application was dried to prepare a negative electrode sheet of Example 1 comprising a negative electrode mixture layer. The application of the magnetic field was carried out by first applying the magnetic field that generates magnetic field lines along the current collector width direction and then continuously varying the direction of the magnetic field lines so that the magnetic field is applied that generates magnetic field lines along the current collector perpendicular direction. The intensity of the magnetic field was 0.495 T.

Meanwhile, $LiNi_{1/3}Mn_{1/3}Co_{1/3}O_2$ as a positive electrode active material, acetylene black (AB) as a conductive material and PVDF as a binding agent were weighed at a mass ratio of 90:8:2 and dispersed in NMP to prepare a paste composition for positive electrode mixture layer formation. An aluminum foil having a thickness of 15 μm was coated with the composition at an application amount of 6 mg/cm$^2$ per side and dried to prepare a positive electrode sheet of Example 1 comprising a positive electrode mixture layer on the aluminum foil.

The thus prepared positive and the negative electrode sheets of Example 1 were stacked and wound with two separator sheets (porous polypropylene/polyethylene composite films), the obtained wound electrode assembly was squashed to a flat shape and placed in a cylindrical container with a liquid electrolyte to prepare a lithium-ion secondary cell of Example 1. The liquid electrolyte used was obtained by dissolving 1 mol/L of $LiPF_6$ in a mixed solvent of ethylene carbonate (EC), dimethyl carbonate (DMC) and ethyl methyl carbonate (EMC) at a volume ratio of 1:1:1.

Comparative Example 1

A negative electrode sheet of Comparative Example 1 was prepared in the similar manner as Example 1 except that a magnetic field generating magnetic field lines along the current collector perpendicular direction was applied to the composition. A lithium-ion secondary cell of Comparative Example 1 was prepared in the similar manner as Example 1 except that the negative electrode sheet of Comparative Example 1 was used.

Comparative Example 2

A negative electrode sheet of Comparative Example 2 was prepared in the similar manner as Example 1 except that a magnetic field was not applied to the composition. A lithium-ion secondary cell of Comparative Example 2 was prepared in the similar manner as Example 1 except that the negative electrode sheet of Comparative Example 2 was used.

Figure 11:
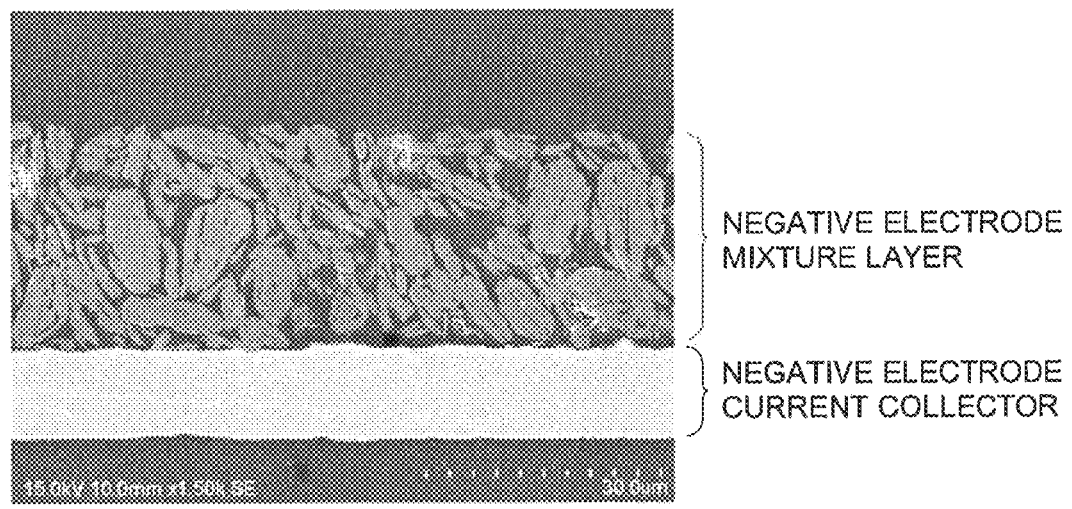
FIG. 11 is a cross-sectional SEM image of a negative electrode sheet according to Example 1.
Figure 12:
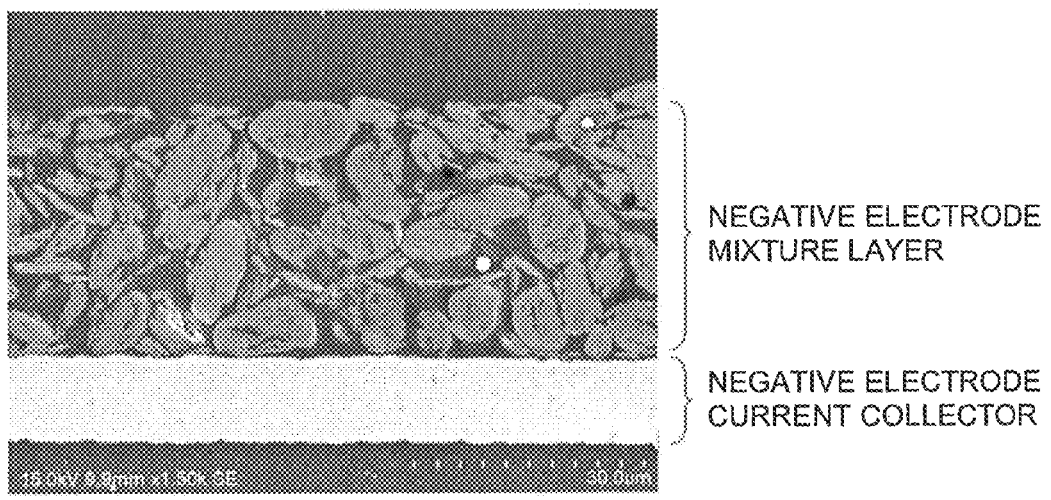
FIG. 12 is a cross-sectional SEM image of a negative electrode sheet according to Comparative Example 1.
Figure 13:
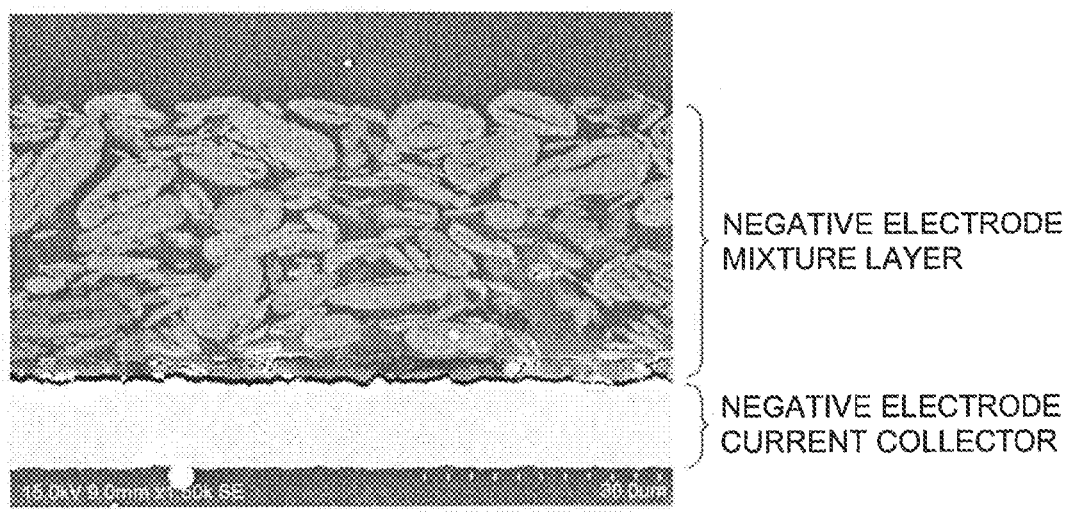
FIG. 13 is a cross-sectional SEM image of a negative electrode sheet according to Comparative Example 2.

FIGS. 11 to 13 are cross-sectional scanning electron microscope (SEM) images of the negative electrode sheets of Example 1, Comparative Example 1 and Comparative Example 2. As shown in FIG. 13, it was found that, in the negative electrode sheet to which a magnetic field was not applied, natural graphite (negative electrode active material) in the negative electrode mixture layer was not arranged along the direction perpendicular to the negative electrode current collector and were rather arranged randomly. As shown in FIG. 12, it was found that, in the negative electrode sheet to which a magnetic field along the current collector perpendicular direction was applied, natural graphite (negative electrode active material) in the negative electrode mixture layer was partially arranged along the direction perpendicular to the surface of the negative electrode current collector and randomly arranged relative to the longitudinal direction of the current collector. On the other hand, as shown in FIG. 11, it was found that, when a magnetic field was continuously applied to the negative electrode sheet from the current collector width direction to the current collector perpendicular direction, most of the natural graphite in the negative electrode mixture layer was arranged (aligned) so as to be perpendicular to the surface of the negative electrode current collector and parallel to the longitudinal direction of the negative electrode current collector.

[Initial Charge Operation]

The charge operation in which the secondary cells were charged at a rate of 1/10 C for 3 hours in a constant current (CC) manner and then charged up to 4.1 V at a rate of 1/3 C and the discharge operation at a rate of 1/3 C up to 3.0 V were repeated three times on the secondary cells. The unit 1 C denotes the amount of current that can charge the battery capacity (Ah) predicted from the positive electrode theoretical capacity in one hour.

[IV Resistance Measurement]

The secondary cells after the initial charge operation were charged at a rate of 4 C under a temperature condition of 25° C. in a constant current-constant voltage (CCCV) manner for 120 seconds and then discharged at a rate of 30 C in a constant current (CC) manner for 10 seconds. This cycle of charge and discharge was repeated 1,000 times. The secondary cells were measured for IV resistance at the number of cycles of 0, 100, 200, 500, 700 and 1,000. Namely the secondary cells were discharged at 150 A in a constant current (CC) manner for 10 seconds and IV resistance (mΩ) was determined from the slope of the primary fitted curve of the current (I)-voltage (V) plot. The results of IV resistance measurements for each examples are shown in Table 1 and FIG. 14.

TABLE 1

| | Example 1 | Comparative Example 1 | Comparative Example 2 |
|---|---|---|---|
| IV resistance at cycle 0 [mΩ] | 3.15 | 3.21 | 3.64 |
| IV resistance at cycle 100 [mΩ] | 3.69 | 3.59 | 3.69 |
| IV resistance at cycle 200 [mΩ] | 3.72 | 3.69 | 3.85 |
| IV resistance at cycle 500 [mΩ] | 3.99 | 4.25 | 5.45 |
| IV resistance at cycle 700 [mΩ] | 4.35 | 5.42 | 9.13 |
| IV resistance at cycle 1,000 [mΩ] | 6.16 | 8.95 | 18.4 |

Figure 14:
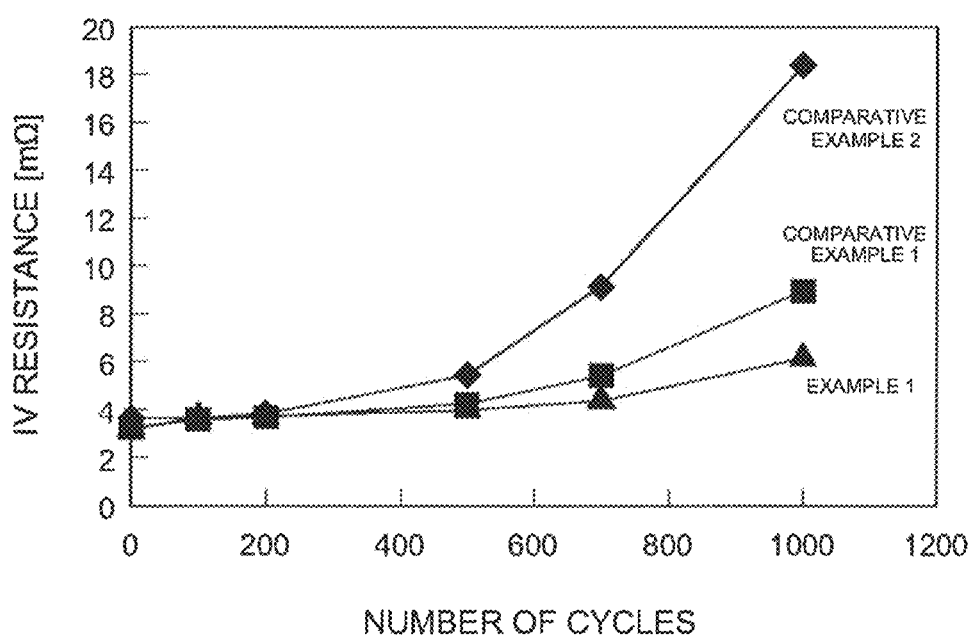
FIG. 14 is a graph showing relation between IV resistance and the number of cycles.
Figure 15:
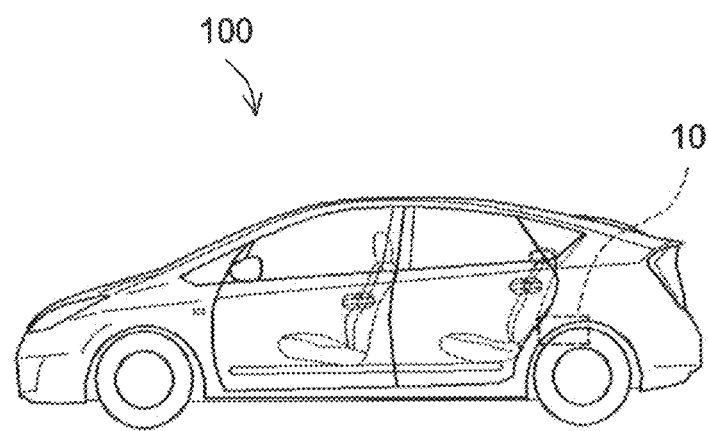
FIG. 15 is a side view which schematically shows a vehicle (automobile) having a lithium-ion secondary cell according to the present invention.

As shown in Table 1 and FIG. 14, the secondary cells of examples had similar IV resistance up to 200 cycles. However significant difference in IV resistance appeared between the secondary cells with an increase in the number of cycles. It was found that the secondary cell according to Example 1 had IV resistance about 30% lower than that of the secondary cell according to Comparative Example 1 at 1,000 cycles.

The specific examples of the present invention have been specifically described hereinabove, which are merely examples and do not limit the scope of the claims. The features described in the claims include various modifications and variations of the above specific examples.

INDUSTRIAL APPLICABILITY

The lithium-ion secondary cell containing the negative electrode according to the present invention has low internal resistance and superior cell performances and therefore can be suitably used particularly as a power supply for motors (electric motors) mounted on vehicles such as automobiles. Accordingly the present invention provides a vehicle (typically an automobile, particularly an automobile comprising an electric motor such as hybrid, electric and fuel cell cars) 100 comprising the lithium-ion secondary cell 10 (typically an assembly battery containing a plurality of the cells 10 connected in series) as a power supply.

REFERENCE SIGNS LIST

10 Lithium-ion secondary cell
15 Battery case
20 Opening
25 Lid
30 Case body
40 Safety valve
50 Wound electrode assembly
60 Positive electrode terminal
62 Positive electrode current collector
64 Positive electrode sheet (positive electrode)
66 Positive electrode mixture layer
67 Positive electrode active material
68 Conductive material
80 Negative electrode terminal
82 Negative electrode current collector
84 Negative electrode sheet (negative electrode)
85 Graphite material
86 Composition
88 Negative electrode mixture layer
90 Separator sheet
100 Vehicle (automobile)
200 Negative electrode manufacturing device
205 Feeding roll
210 Collecting roll
220 Composition coating member
222 Die
230 Magnetic field application member
235, 235A, 235B, 235C, 235D Magnetic field generator
240 Guide
250 Drying furnace
582 Negative electrode current collector
585 Graphite material
586 Composition

The invention claimed is:

1. A lithium-ion secondary cell comprising a wound electrode assembly including a positive electrode and a negative electrode that are wound with a separator interposed therebetween; and a liquid electrolyte, wherein
the negative electrode includes an elongated negative electrode current collector, and a negative electrode mixture layer that is formed on the surface of the negative electrode current collector and contains at least a graphite material, and
the graphite material in the negative electrode mixture layer is arranged such that a (002) plane of 80 mass % or more of the graphite material is perpendicular to the surface of the negative electrode current collector and parallel to the longitudinal direction of the elongated negative electrode current collector.

2. The lithium-ion secondary cell according to claim 1, wherein the graphite material has a median diameter ($D_{50}$) of 5 μm to 20 μm according to a particle size distribution measured based on a laser diffraction and scattering method.

3. A method for manufacturing a lithium-ion secondary cell comprising a wound electrode assembly including a positive electrode and a negative electrode that are wound with a separator interposed therebetween, the positive electrode including a positive electrode mixture layer formed on a positive electrode current collector, the negative electrode including a negative electrode mixture layer formed on a negative electrode current collector, and a liquid electrolyte, the method comprising:
mixing and kneading at least a graphite material with a predetermined solvent to prepare a paste composition for negative electrode mixture layer formation;
coating the surface of an elongated negative electrode current collector with the prepared composition; and
applying a magnetic field to the coated composition to form a negative electrode mixture layer in which the graphite material contained in the composition is arranged such that a (002) plane of at least 50 mass % of the graphite material is perpendicular to the surface of the elongated negative electrode current collector and parallel to the longitudinal direction of the negative electrode current collector, wherein
when forming the negative electrode mixture layer, a magnetic field is first applied that generates magnetic field lines along a current collector width direction that is defined as the direction perpendicular to the longitudinal direction of the elongated negative electrode current collector as well as the direction oriented from one long side of the negative electrode current collector toward the other long side, and then the direction of the magnetic field lines is continuously varied so that a magnetic field is applied that has magnetic field lines along a current collector perpendicular direction that is defined as the direction perpendicular to the surface of the negative electrode current collector, thereby displacing the graphite material such that the (002) plane of the graphite material contained in the composition is perpendicular to the surface of the negative electrode current collector and parallel to the longitudinal direction of the negative electrode current collector.

4. The method according to claim 3, wherein
the coating with the composition is performed by moving the elongated negative electrode current collector in a predetermined direction and continuously coating the surface of the moving negative electrode current collector with the composition, and
the application of the magnetic field to the coated composition includes application of the magnetic field with a magnetic field generator that is disposed along the negative electrode current collector coated with the composition and moving in the predetermined direction such that the direction of magnetic field lines varies from the current collector width direction to the current collector perpendicular direction toward downstream of the negative electrode current collector from upstream thereof.

5. The method according to claim 4, wherein the magnetic field generator is a plurality of magnets or a plurality of coils which is respectively disposed at gradually varying angles such that the direction of the magnetic field lines varies from the current collector width direction to the current collector perpendicular direction toward downstream of the negative electrode current collector from upstream thereof.

6. The method according to claim 3, wherein the composition has a solid content ratio of 40 mass % to 55 mass %, provided that the total amount of the composition is 100 mass %.

7. The method according to claim 3, wherein during formation of the negative electrode mixture layer, the composition is dried while a magnetic field having magnetic field lines oriented to the current collector perpendicular direction is applied to the composition.

\* \* \* \* \*